(12) United States Patent
Lading et al.

(10) Patent No.: US 6,254,197 B1
(45) Date of Patent: Jul. 3, 2001

(54) HYDRAULIC BRAKING SYSTEM

(75) Inventors: Per Lading, Ballerup; Ole Sangill, Ishøj; David Welner, Lyngby, all of (DK)

(73) Assignee: Svendborg Brakes A/S, Vejstrup (DK)

( * ) Notice: Subject to any disclaimer, the term of this patent is extended or adjusted under 35 U.S.C. 154(b) by 0 days.

(21) Appl. No.: 09/308,588

(22) PCT Filed: Nov. 20, 1997

(86) PCT No.: PCT/DK97/00532

§ 371 Date: Sep. 2, 1999

§ 102(e) Date: Sep. 2, 1999

(87) PCT Pub. No.: WO98/23474

PCT Pub. Date: Jun. 4, 1998

(30) Foreign Application Priority Data

Nov. 22, 1996 (DK) ................................................ 1337/96

(51) Int. Cl.⁷ ............................ B60T 13/22; B60T 13/68
(52) U.S. Cl. ...................................... 303/2; 303/3; 303/15
(58) Field of Search .............................. 303/2, 3, 15, 14, 303/DIG. 3, DIG. 4, 112, 10, 84.1, 84.2, 9.61, 9.62, 113.1; 188/181 T, 106 P

(56) References Cited

U.S. PATENT DOCUMENTS

| | | |
|---|---|---|
| 3,646,959 | 3/1972 | Connett et al. . |
| 3,990,352 | 11/1976 | Nishida et al. . |
| 4,447,044 | 5/1984 | Nakata . |
| 4,458,791 * | 7/1984 | Schneider et al. .................. 188/170 |
| 4,664,247 * | 5/1987 | Wolf et al. . |
| 5,052,532 | 10/1991 | Plate . |
| 5,203,616 | 4/1993 | Johnson . |
| 5,611,199 * | 3/1997 | Bray ....................................... 60/413 |
| 5,630,489 * | 5/1997 | Bebernes ................................ 303/3 |

FOREIGN PATENT DOCUMENTS 4233287   4/1994   (DE) .

* cited by examiner

Primary Examiner—Douglas C. Butler
(74) Attorney, Agent, or Firm—Birch, Stewart, Kolasch & Birch, LLP

(57) ABSTRACT

A hydraulic braking system, method for controlling the hydraulic braking system, and a control system for controlling the hydraulic braking system are provided. The hydraulic braking system may be applied to any kind of moving elements or systems. For example, this system can be used with wind turbines, conveyor systems, etc.

34 Claims, 6 Drawing Sheets

| Equivalent brake torque related to nominal torque | Braking time [sec] | Partial damage per. braking sequence | Max. braking number before damage | Lifetime in year by 2 weekly braking sequences |
|---|---|---|---|---|
| 1.50 | 8.0 | 0.0001 | 10000 | 96.2 |
| 1.75 | 6.9 | 0.0003 | 3000 | 28.8 |
| 2.00 | 6.0 | 0.0009 | 1080 | 10.4 |
| 2.25 | 5.3 | 0.0023 | 440 | 4.2 |
| 2.50 | 4.8 | 0.0052 | 200 | 1.9 |
| 2.75 | 4.4 | 0.0108 | 93 | 0.9 |
| 3.00 | 4.0 | 0.0211 | 48 | 0.5 |
| 3.25 | 3.7 | 0.0390 | 26 | 0.3 |
| 3.50 | 3.4 | 0.0691 | 15 | 0.1 |

Fig. 2

| Type | Hard | SOBO | Throttle |
|---|---|---|---|
| Max. relative torque | 2.53 | 0.86 | 2.28 |
| Max. relative torque span | 4.15 | 1.06 | 3.20 |
| Max. relative torque span by stop | 3.67 | 0.72 | 3.20 |
| Mechanical braking time [sec] | 4.0 | 18 | 6.8 |

Fig. 5

HYDRAULIC BRAKING SYSTEM

This application is the national phase under 35 U.S.C. §371 of PCT International Application No. PCT/DK97/00532 which has an International filing date of Nov. 20, 1997 which designated the United States of America.

The present invention relates to a hydraulic braking system, to a method for controlling the hydraulic braking system and to a control system for controlling the hydraulic braking system. The hydraulic braking system may be applied to any kind of moving elements or systems, e.g., turbines, in particular wind turbines, conveyer systems etc.

The invention is suited for hydraulic brakes and is able to secure a soft, graduated braking sequence through a simple and cheap electro-hydraulic regulation system. A hydraulic braking system according to the invention provides a system that prevents the high braking torque that is the result of a normal braking with full torque applied.

The very high braking torque results in lifetime loss in the attached transmission system. Especially the overshoot and oscillations occurring after the rotor has been stopped are damaging.

The usual approach of solving this problem is to control the braking torque by regulating the braking pressure using one or several proportional valves. Though proportional valves allow an effective and accurate control of the braking pressure, their use is an expensive way of obtaining a controlled braking torque.

Thus, the aim of the invention is to provide a hydraulic braking system, a method for operating it, and a control system therefore, where the braking pressure is controlled by at least one on/off valve, in particular by at least one three-way valve.

From the prior art, hydraulic braking systems comprising three-way valves and alternative kinds of valves are known.

U.S. Pat. No. 3,646,959 discloses an alternative valve for controlling the motion of a crane. The control valve comprises two three-way valves for controlling the hydraulic pressure at a motor. The difference between the two pressures provided from the two valves determines the direction and the velocity of the motor. However, the valve is manually controlled, and the working principle of the valve is based on the presence of at least two sources of hydraulic fluid under pressure.

An alternative valve is disclosed in U.S. Pat. No. 3,990,352 concerning a control valve for controlling the hydraulic pressure at a hydraulic clutch. The valve is designed with a spool and a sliding lever arranged in place in the main body of the valve in such a manner as to be free to slide therein, the valve thus constituting an alternative form of a proportional valve. This valve is manually controlled.

A major problem of these known systems is that they do not allow an automatic control of the braking pressure and the speed of the machine to be braked. Further, their mechanical design is rather complex and they comprise a large number of parts.

The present invention provides a novel, simple and effective alternative to known hydraulic braking systems. The present invention also provides a braking system that, besides from being cheaper than prior art braking systems, also allows a more effective and accurate control of the braking sequence. The invention also provides a method of controlling the braking system according to the invention and a control system as such.

In one aspect, the invention relates to a hydraulic braking system comprising
a hydraulic brake with a hydraulic fluid chamber,
a source of hydraulic fluid for supplying hydraulic fluid at a pressure greater than ambient pressure, and
a first hydraulic valve means having
a first port connected to the source of hydraulic fluid,
a second port connected to the hydraulic fluid chamber,
a third port connected to the ambience,
a first switch which in a first position connects the first port to the second port and closes the third port and which in a second position closes the first port and connects the second port to the third port,
whereby the hydraulic pressure in the hydraulic fluid chamber can be controlled by selectively positioning the switch in its first and second positions so as to control the braking pressure exerted by the hydraulic brake.

Thus, the invention provides a hydraulic braking system in which the braking pressure may be controlled by a valve means having a switch having an on- and an off-position. By selectively positioning the switch of the valve in its on- or off-position, the hydraulic pressure in the hydraulic fluid chamber of the brake mechanism may be increased or decreased, depending upon whether the braking mechanism comprises a positive or negative braking mechanism. When the hydraulic pressure is to be increased, the switch is positioned in a position connecting the hydraulic chamber of the brake to the source of hydraulic fluid under pressure. When the braking pressure is to be decreased, the switch is put in a position connecting the hydraulic chamber of the brake to, e.g., a fluid container at a pressure lower than or equal to the pressure of the hydraulic fluid chamber.

The hydraulic system according to the invention may further comprise a first hydraulic accumulator for the hydraulic fluid under pressure for preservation of the hydraulic pressure during a time period after pressure loss in the hydraulic fluid supplied by the source. The first accumulator preferably secures a sufficient amount of hydraulic fluid so as to feed the brake during a braking sequence in case of a power cut, when the source of hydraulic fluid under pressure is dependent on a power supply. Further, the first accumulator tends to smoothen the pressure variations that may exist in the hydraulic system.

Preferably, the hydraulic fluid is oil. However other fluids with suitable properties, e.g., high viscosities, may be used.

The hydraulic system according to the invention may further comprise a second valve means, preferably a three-way valve, having
a first port connected to the source of hydraulic fluid, when said first switch is in its first position, and is connected to the ambience, when said first switch is in its second position,
a second port connected to the hydraulic fluid chamber,
a third port connected to the ambience,
a second switch which in a first position connects the first port to the second port and closes the third port and which in a second position closes the first port and connects the second port to the third port,
whereby the hydraulic pressure in the hydraulic fluid chamber is increased, when the second switch is in its first position, and when the first switch is in its first position, and whereby the hydraulic pressure in the hydraulic fluid chamber is decreased, when the second switch is in its second position.

By introducing the second valve means in series with the first valve means, the second valve means may constitute an "emergency" valve in case the braking mechanism is a negative braking mechanism. When positioning the second switch in a position that connects the hydraulic fluid chamber to a low pressure, e.g., ambient pressure, the brake will brake at its maximum braking torque irrespective the position of the first switch. For a positive braking mechanism, the system would work in an analogous way.

The hydraulic system according to the invention may further comprise a throttling valve connected in series with the first and the second valve means for throttling the flow so that volume flow rate of the hydraulic fluid flowing into or out of the hydraulic chamber is substantially constant. The physical characteristics of the throttling valve further influence the response time of the pressure in the hydraulic fluid chamber to control signals controlling the operation of the switches. The throttling valve may thus constitute a substantial part of the control system.

The hydraulic system according to the invention may further comprise a second hydraulic accumulator of hydraulic fluid under pressure connected to the hydraulic system between the first valve means and the hydraulic fluid chamber for increasing the displaced hydraulic fluid volume to or from the fluid chamber. The increase in displaced hydraulic fluid volume obtained by introducing the second accumulator allows the use of larger throttle areas, which is desired in order to reduce the sensitivity of the first and second valve means to conditions and quality of the hydraulic fluid. In particular the sensitivity to dirt and to temperature variations is reduced. Further, the second hydraulic accumulator tends to smoothen pressure variations in the hydraulic system.

The source of hydraulic fluid under pressure preferably comprises a pump being connected at its suction side to a hydraulic fluid container and at its pressure side to the first port of the first valve means. Preferably, the hydraulic fluid running back from the hydraulic fluid chamber of the brake through one or both of the two valve means, is lead to the container.

The hydraulic system according to the invention preferably further comprises a pressure relief valve limiting the pressure at the pressure side of the pump to a maximum threshold value defined by the relief valve, e.g., by a spring load.

Preferably, the hydraulic system further comprises a manometric switch for sensing pressure in the hydraulic system at the pressure side of the pump and for switching the pump on when the pressure is lower than a prescribed minimum threshold value, and for switching the pump off, when the pressure is greater than a prescribed maximum threshold value.

Preferably, the braking mechanism comprises a negative braking mechanism. According to the invention, however, the braking mechanism may alternatively comprise a positive braking mechanism.

The position of at least one bu preferably both of the first and second switches can be activated by electrical signals.

Preferably, the position of at least one of the first and second switches can alternatively or additionally be switched by mechanical means, in particular the second switch is preferably switchable by hand in case the brake mechanism is a negative brake. Thereby, the hand switching of the second valve means may constitute a normal emergency brake.

Preferably, the first switch can be switched by hand so as to relieve the pressure in the hydraulic system.

The invention further relates to a method for controlling a hydraulic braking system according to the invention controlling the velocity of a moving mechanical element or system, comprising the step of controlling the pressure in the hydraulic fluid chamber by positioning the first switch in that of its first and second positions that either increases or decreases the hydraulic pressure for a prescribed second time interval thereby obtaining a controlled acceleration or deceleration of the moving mechanical element or system.

Preferably, the method according to the invention further comprises the steps of
  storing in a memory a prescribed function of velocity of the moving mechanical element or system as a function of time,
  determining the velocity at prescribed first time intervals,
  at each determination of the velocity at the prescribed first time intervals:
    comparing the determined velocity with a corresponding prescribed velocity, and
    switching the first switch into that of its first and second positions that increases the braking pressure exerted by the hydraulic brake for a prescribed third time interval, if the determined velocity is greater than the corresponding prescribed velocity, and
    switching the first switch into that of its first and second positions that decreases the braking pressure exerted by the hydraulic brake for a prescribed fourth time interval, if the determined velocity is smaller than the corresponding prescribed velocity,
whereby the velocity of the moving mechanical system as a function of time will approximately follow the prescribed velocity.

In case the movement to be controlled is a rotation, it is preferred to store a ramp prescribing rpm as a function of time.

The method according to the invention may further comprise the steps of
  storing the determined velocity of the moving mechanical element or system at a number of time instants,
  determining the actual acceleration or deceleration of the moving mechanical element or system from the stored values of determined velocity,
  determining the actual pressure in the hydraulic fluid chamber at prescribed fifth time intervals,
  determining the desired pressure in the hydraulic fluid chamber at prescribed sixth time intervals from the determined actual acceleration or deceleration and from mechanical characteristics of the moving mechanical element or system and of the hydraulic brake,
  at each determination of the actual pressure:
    comparing the determined actual pressure with the corresponding desired pressure, and
    switching the first switch into that of its first and second positions that increases the braking pressure exerted by the hydraulic brake for a prescribed seventh time interval, if the determined actual pressure is smaller than the corresponding desired pressure, and
    switching the first switch into that of its first and second position that decreases the braking pressure exerted by the hydraulic brake for a prescribed eighth time interval, if the determined actual pressure is greater than the corresponding desired pressure.

Thereby, a more accurate control of the braking pressure is obtained compared to controlling the braking system only from the velocity of the moving device as input parameter. The mechanical characteristics of the moving mechanical element or system from which the desired pressure is determined are quantities like the mass, velocity and inertia of the system as well as the friction coefficients between the brake and the moving parts to be braked and the predefined braking load, e.g., a predefined spring load.

Preferably the first, second, third, fourth, fifth, sixth, seventh and eighth time intervals are substantially smaller than the total braking time interval. The total braking time interval is the total time that passes from the moment, where the braking sequence is started to the moment, where the moving mechanical element or system has been stopped. Preferably the operations taking place during the first, second, third, fourth, fifth, sixth, seventh and eighth time intervals take place substantially at the same time. In a preferred embodiment of the invention, the eight time intervals are shorter than 5 seconds. In a more preferred embodiment of the invention, the eight time intervals are shorter than 1 second. In a more preferred embodiment of the invention, the eight time intervals are shorter than 1/10 of a second. In the most preferred embodiment of the invention, the eight time intervals are shorter than 1/40 of a second. The eight time intervals may, however, be even shorter. Obviously, the control of the braking sequence is more accurate for the time intervals being as short as possible.

The method according to the invention preferably further comprises the step of switching the second switch into its second position, when the velocity of the moving device exceeds a maximum threshold value.

Preferably, the method according to the invention further comprises the step of switching the second switch into its second position in any situation, where the first valve means may not be used for controlling the braking pressure. This situation may occur, e.g., when an error in the first valve means or in the components of the control system has been detected, or in an emergency situation, where the moving mechanical element or system has to be stopped.

The invention further relates to a method for controlling at least two braking systems according to the invention, wherein each of the braking systems is controlled by a method according to the invention, the method comprising the steps of initiating the braking sequence of each of the braking systems by the same signal, and controlling the braking sequence of each of the braking systems from the same prescribed function of velocity of the moving mechanical element or system, so as to obtain synchronized braking sequences for the at least two braking systems.

The synchronization thereby obtained is useful for mechanical systems, e.g., conveyor systems, comprising a number of braking systems according to the invention.

The invention further relates to a control system for the hydraulic braking system according to the invention adapted to increase or decrease a velocity of a moving mechanical element or system. The control system comprises means for storing a prescribed function of velocity of the moving mechanical element or system as a function of time, means for determining the velocity of the moving mechanical element or system at prescribed first time intervals, valve control means for controlling a switching of the first switch between its first and second positions.

In the control system according to the invention, the valve control means preferably comprise a processor means adapted to at each determination of the velocity:

deriving from the storing means a corresponding prescribed velocity, and comparing the determined velocity with the corresponding prescribed velocity, and switching the first switch into that of its first and second positions that increases the braking pressure exerted by the hydraulic brake for a prescribed second time interval, if the determined velocity is greater than the corresponding prescribed velocity, and switching the first switch into that of its first and second positions that decreases the braking pressure exerted by the hydraulic brake for a prescribed third time interval, if the determined velocity is smaller than the corresponding prescribed velocity.

The control system according to the invention may further comprise means for storing the determined velocity at a number of time instants, processor means for determining the actual acceleration or deceleration of the moving mechanical element or system from the stored values of determined velocity, means for determining the actual pressure in the hydraulic fluid chamber at prescribed fourth time intervals, processor means for determining the desired pressure in the hydraulic fluid chamber at prescribed fifth time intervals from the determined acceleration or deceleration and from mechanical characteristics of the moving mechanical element or system and the hydraulic brake, processor means for at each determination of the actual pressure comparing the determined actual pressure with the corresponding desired pressure, and switching the first switch into that of its first and second positions that increases the braking pressure exerted by the hydraulic brake for a prescribed sixth time interval, if the determined actual pressure is smaller than the corresponding desired pressure, and switching the first switch into that of its first and second positions that decreases the braking pressure exerted by the hydraulic brake for a prescribed seventh time interval, if the determined actual pressure is greater than the corresponding desired pressure.

Preferably the control system according to the invention further comprises means for storing a maximum threshold value of the velocity of the moving mechanical element or system, and processor means for switching the second switch into its second position, when the velocity of the moving mechanical element or system exceeds the maximum threshold value.

Further, the control system according to the invention, comprises processor means for switching the second switch into its second position in any emergency situation registered by the control system. An emergency situation may occur, e.g., when an error in the first valve means or in the control system has been detected.

Preferably, the control system according to the invention further comprises means for supervising the components of the control system, such that in case of an error being registered in the components of the control system, the braking pressure may only be increased by switching the second switch into its second position. The supervision of the components of the control system may, e.g., be performed electronically at regular time intervals, and may comprise checking of electric connections, power supply, electronic interfaces etc.

In case the mechanical device to be braked is a rotor, it is preferred that the device for measuring the velocity of the rotor is a revolution counter.

Preferably, the control system according to the invention comprises standard state-of-the-art electronic components, such as a processor, memory circuits etc. The electronic components may be mounted on a print and electrically connected to the switches of the valve means and to the sensing devices, e.g., velocity measuring or pressure sensing devices. The control system may further comprise a power supply, preferably a uninterrupted power supply (UPS), preferably connected to an emergency power chain.

Preferably, the control system is programmed for adapting the braking system to different applications, in particular different functions of the velocity of the moving mechanical device or system as a function of time may be programmed into the memory of the control system.

The control of the braking pressure may be based on the pressure difference between the pressure in the hydraulic fluid chamber and the ambient pressure. The ambient pressure may be the barometric pressure, but it may, however, be any pressure lower than or equal to the pressure exerted in the hydraulic fluid chamber.

The invention further relates to a control system for at least two braking systems according to the invention, each of them being controlled by a control system according to the invention, the control system comprising means for initiating the braking sequence of each of the braking systems by the same signal, and means for controlling the braking sequence of each of the braking systems from the same prescribed function of velocity of the moving mechanical element or system, so as to obtain synchronized braking sequences for the at least two braking systems.

The synchronization thereby obtained is useful for mechanical systems, e.g., conveyor systems, comprising a number of braking systems according to the invention.

A detailed description of the invention, in particular of a preferred embodiment thereof, now follows in conjunction with the appended figures, in which:

FIG. 1 is a schematic diagram of the preferred embodiment of the hydraulic part of the braking system, FIG. 2 is a table showing an example of equivalent brake torque related to nominal torque, braking time, partial damage per braking sequence, max. braking number before damage and lifetime in years by two weekly braking sequences, FIG. 3 is a graph showing an example of braking torque influence on gearbox lifetime for wind turbines, FIG. 4 is a schematic diagram of the main components of the preferred embodiment of the braking system, FIG. 5 is a table showing an example of max. relative torque, max. relative torque span, max. relative torque span by stop an mechanic braking time for different types of braking systems, FIG. 6 is a graph showing an example of the relative torque as a function of time for a "hard" braking sequence, using a prior art braking system, FIG. 7 is a graph showing an example of the relative torque as a function of time for a throttled braking sequence, using a prior art braking system, FIG. 8 is a graph showing an example of the relative torque as a function of time for a "soft" braking sequence, using the preferred embodiment of the braking system according to the invention.

Figure 1:
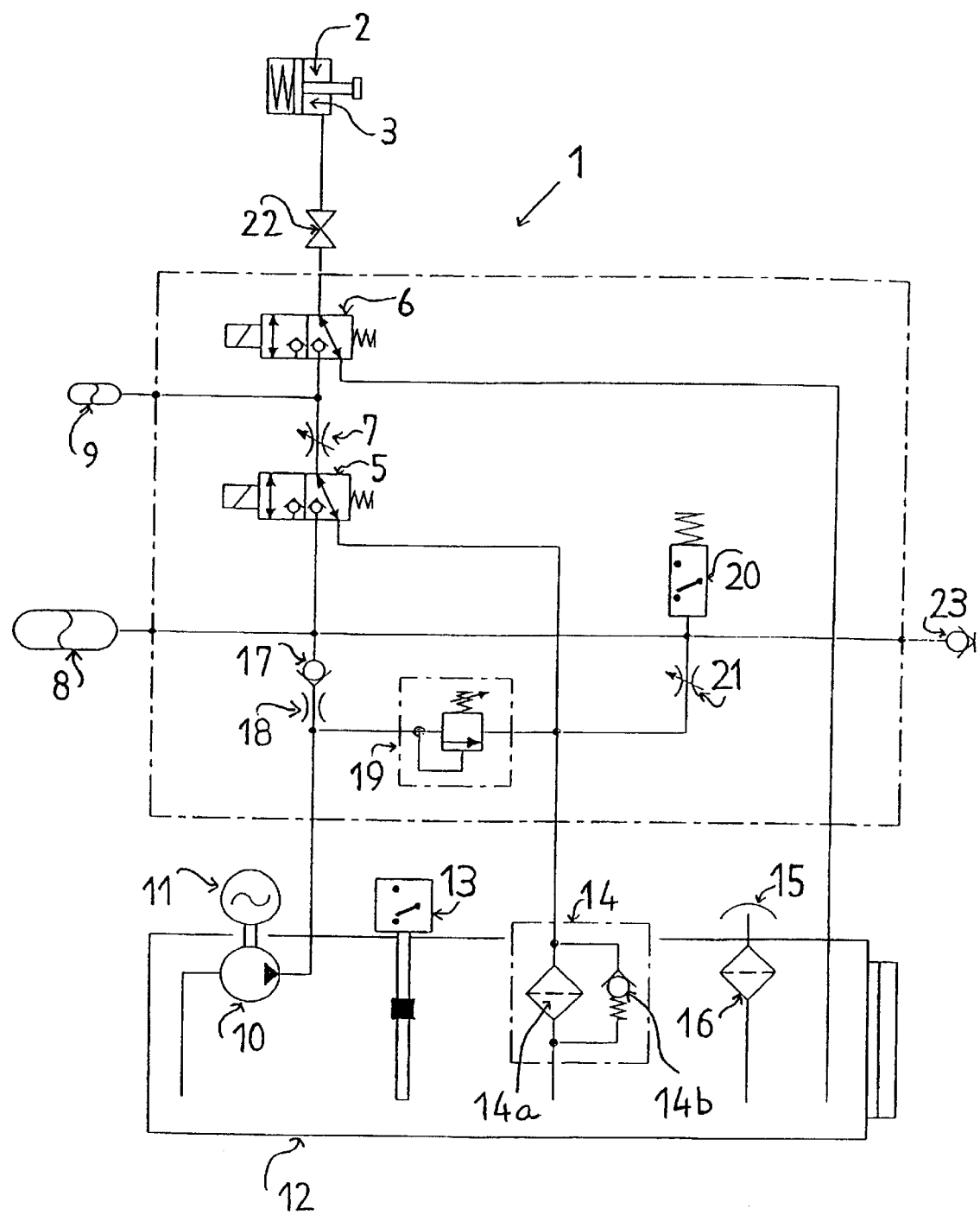

A preferred embodiment of the hydraulic unit of the braking system, generally indicated by the reference numeral 1, is shown in FIG. 1. The system comprises a hydraulic brake mechanism 2 with a hydraulic fluid chamber 3.

Figure 4:
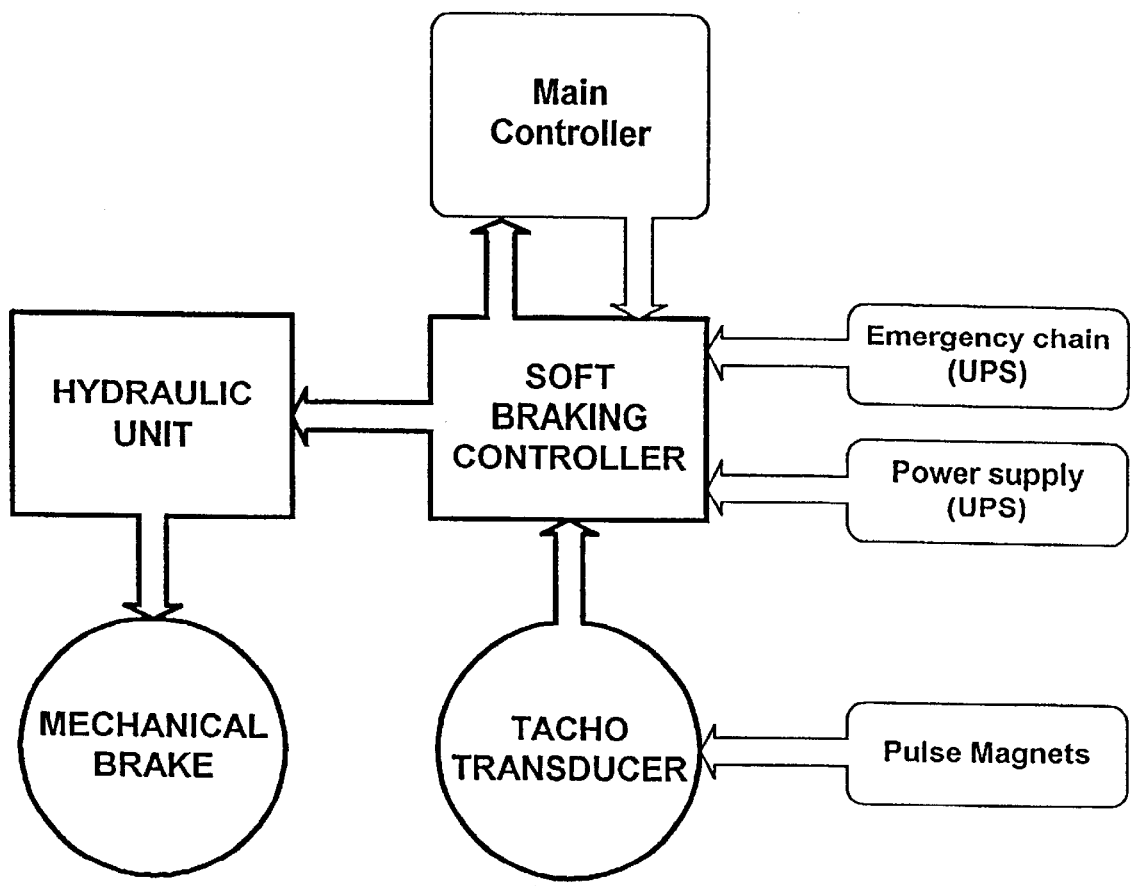

The main components of the preferred embodiment of the braking system are shown in FIG. 4. The hydraulic unit 1 is hydraulically connected to the hydraulic chamber 3 of the mechanical brake 2 and electrically connected to a braking controller. The braking controller is connected to a main controller of a moving machine, e.g., a wind turbine or a conveyer system in which the braking system of the preferred embodiment is used. A Soft Braking Controller (SBC) is the key control link. Communication with the main controller is made with simple on/off signals normally used for hydraulic valves, allowing the present system to be used with existing braking systems. The main controller preferably comprises a surveillance option for overspeed and selftest of the SBC.

The control parameter used in a simple version of the SBC is the rpm of the brake disk or attached parts, monitored through an appropriate sensor, e.g., an inductive tacho transducer. To generate signals, the rotating parts may be equipped with pulse magnets.

In a preferred, more advanced version of the SBC, the pressure in the hydraulic chamber 3 of the brake mechanism 2 is used as a control parameter.

The SBC is electrically connected to two valves 5 and 6 in the hydraulic unit 1 that is hydraulically connected to the hydraulic chamber 3 of the braking mechanism 2.

An external power supply is provided to power the SBC. In order to provide uninterrupted power supply, a UPS (Uninterrupted Power Supply) is used for the main power supply and for an emergency chain powering the components of the control system in case of a power cut. The same UPS may be used for both the SBC and for the emergency chain.

Preferably, the brake 2 is constituted by a negative braking mechanism as shown in FIG. 1. In this case, the braking mechanism will brake the machine (not shown) to be braked, when a predefined pressure exerted on the fluid of the hydraulic fluid chamber 3 by a predefined load, e.g. a spring load, of the braking mechanism is greater than the hydraulic pressure in the hydraulic fluid chamber 3.

When the brake 2 is constituted by positive braking mechanism, which is not the case in the presently preferred embodiment of the invention, the braking mechanism will brake the machine to be braked, when the hydraulic pressure in the hydraulic fluid chamber is greater than a predefined pressure exerted on the fluid of the hydraulic fluid chamber by a predefined load, e.g. a spring load, of the braking system.

A first on/off valve 5 controls the volume flow of hydraulic fluid to the chamber 3.

A second on/off valve 6 is mounted in series with the first on/off valve 5. When the second valve 6 is in its on position, it allows fluid to pass from the first valve 5 to the hydraulic fluid chamber 3 or from the hydraulic fluid chamber 3 to the first valve 5.

During normal operation, the second valve 6 is in its on-position, whereby the flow of hydraulic fluid to or from the chamber 3 is controlled by the first valve 5.

In the embodiment shown in FIG. 1, each of the on/off valves 5 and 6 is constituted by a three-way valve. Other types of valves are possible, e.g. two synchronized two-way valves, substituting one three-way valve.

The working principle of the braking system is now described in detail. In its on-position, the first valve 5 is on one side connected to a source of hydraulic fluid under pressure, and, on the other side, to the chamber 3 of the hydraulic brake 2, through the second valve 6, whereby the source of hydraulic fluid under pressure is connected to the chamber 3. In its off-position, the valve 5 interconnects the chamber 3 and a container 12 being at ambient pressure.

A prescribed velocity of the machine to be braked as a function of time is stored by the control system (not shown) of the braking system. A velocity meter (not shown), e.g., a revolution counter measuring the velocity of the machine to be braked is connected to the control system. During the braking sequence, the control system will switch the valve 5 into its on-position if the velocity of the machine is lower than the prescribed velocity at a given time instant, whereby the braking pressure is reduced as the pressure of the hydraulic fluid is increased. If the velocity of the machine is greater than the prescribed velocity at a given time instant, the control system will switch the valve into its off-position, whereby the braking pressure is increased as the pressure of the hydraulic fluid is reduced. The sampling is preferably performed at time intervals substantially smaller than the total braking time interval.

A hydraulic accumulator 9 is positioned between the first valve 5 and the second valve 6 and is used to increase the displaced oil volume to or from the chamber 3, thereby reducing the sensitivity of the first and second valves 5 and 6 to conditions and the quality of the hydraulic fluid. Further, the hydraulic accumulator 9 smooths pressure variations that may exist in the hydraulic system.

In an alternative preferred embodiment, the braking pressure is controlled by the pressure in the chamber 3 so as to obtain a controlled, smooth braking sequence. The control system stores a function of velocity as a function of time. At a given time instant, a desired braking pressure is computed from the acceleration or deceleration of the machine to be braked at the given time instant, and the braking pressure is increased or reduced depending upon whether the actual braking pressure is greater than or less than the desired braking pressure.

In case the brake 2 comprises a positive braking mechanism, which is not the case in the preferred embodiment, the valve 5 is to be switched into its on-position when the velocity of the machine to be braked is greater than the prescribed velocity at the time instant in question, whereas the valve 5 is to be switched into its off-position when the velocity of the machine is lower than the prescribed velocity at the time instant in question.

When the second valve 6 is in its off-position, fluid cannot pass from the first valve 5 to the chamber 3, and thus the braking mechanism will brake with its maximum braking force, i.e. the force exerted by the spring load, as the pressure in the chamber 3 is reduced to ambient pressure, when the second valve 6 is in its off-position.

During normal operation, the second valve 6 will stay in its on-position. However, the second valve 6 is connected to a mechanical switch (not shown) that may be activated manually so as to switch the valve 6 from its on-position to its off-position, which is useful, e.g. in an emergency situation. Further, the control system may switch the second valve 6 to its off-position in case the electronic watch system supervising the control system registers an error in the electronic components of the control system. In the latter case, the control system will let the valve 6 stay in its on-position, thereby allowing the machine to be braked to continue running until the brake system 1 is activated. When the brake is activated, the valve 6 will then be switched to its off-position by the control system, the brake system thereby performing a hard, uncontrolled braking. Thus, the preferred embodiment of the braking system according to the invention allows a hard, uncontrolled braking in case the electronic watch system registers an error in the electronic components of the control system.

A two-way throttling valve 7 may be connected in series with the valves 5 and 6 for throttling the flow so that the volume flow rate of the hydraulic flow rate of the hydraulic fluid flowing into or out of the chamber 3 is substantially constant. The physical characteristics of the throttling valve 7 further influences the response time of the hydraulic pressure in the hydraulic fluid chamber 3 of the braking mechanism 2 to the control signals. The throttling valve 7 thus constitutes a part of the control system.

In the preferred embodiment of the invention, the source of hydraulic fluid comprises a fluid container 12, a pump 10 and a power supply 11 for supplying power to the pump 10. At its suction side, the pump 10 is connected to the fluid container 12, and at its pressure side it is connected to the first valve 5.

The accumulator 8 contains fluid under pressure such that a controlled, smooth braking sequence may be performed in the case that the supply from the source of hydraulic fluid under pressure is interrupted, e.g. during a power fall out. Further, the accumulator 8 smooths pressure variations in the hydraulic system.

The fluid container 12 may be equipped with hydraulic standard equipment, such as a tank meter 13, a back-flow filter unit 14 comprising a filter 14a and a back valve 14b and a refill unit 15 comprising a filter 16. The pressure of the hydraulic fluid in the container 12 is lower than the pressure at the pressure side of the pump 10 and preferably equal to ambient pressure.

Preferably, fluid flowing from the chamber 3 through the valve 6, when the valve 6 is in its off-position is lead back to the container 12 by a connecting pipe, and fluid flowing from the chamber 3 through the valve 5, when the valve 5 is its off-position and when the valve 6 is in its on-position, is lead back to the container 12 by a connecting pipe.

At the pressure side of the pump 10, the pressure may be limited to a maximum threshold value by a pressure relief valve 19.

The hydraulic system 1 may further comprise a manometric switch 20 for sensing pressure in the hydraulic system at the pressure side of the pump 10 and switching the pump 10 on, when the pressure is lower than a prescribed minimum threshold value, and for switching the pump 10 off, when the pressure is greater than a prescribed maximum threshold value.

The hydraulic system 1 may further comprise a throttling valve 18 and a back valve 17 at the pressure side of the pump and a two-way throttling valve 21. The throttling valve 18 smooths pressure variations and sudden pressure jerks on the pressure side of the pump 10 generated by the pump 10 when in operation. When the pump 10 is not in operation, the back valve 17 will be shut, thereby preventing hydraulic fluid from flowing back to the pump 10, and thereby preserving the hydraulic pressure in the hydraulic chamber 3, when the valves 5 and 6 are in their open positions.

Preferably, the two-way throttling valve 21 is constituted by an on/off valve. During running of the hydraulic system 1, the valve 21 will be closed. The pressure in the hydraulic system may be relieved by opening the valve 21.

The pressure in the hydraulic system 1 may further be relieved by manually switching the switch of the valve 5 to its off-position.

The hydraulic system may further comprise a valve 22 at the interconnection between the braking mechanism 2 and the hydraulic system for manually interrupting the hydraulic interconnection to the hydraulic chamber 3. Further, a back valve 23 may be mounted between the hydraulic system 1 and the surroundings so as to mount, e.g., a manometer or any other measuring device. The back valve 23 further allows the pressure in the hydraulic system 1 to be relieved manually.

In order to illustrate the background for the present invention and the effects of soft graduated braking sequences obtained by using a braking system according to the invention, two examples are given below. Example 1 generally concerns gearbox damage in a wind turbine and gear box life time in relation to the number of braking sequences, while Example 2 concerns torque measurements on a wind turbine using different braking systems, including a braking system according to the invention.

Example 1

Gear box damage and life time

A mechanical brake system must be designed to brake or slow down a turbine at an extreme load, the braking load being defined as an average torque factor of approximately 2 related to the nominal load, the dynamic peaks being even higher. If the brake torque is less than twice the nominal load, the brake will not be able to brake a rotor in an overspeed situation.

The very high brake torque results in lifetime loss in the attached transmission system, every time the turbine brakes, also in the cases where only a fraction of the full braking torque is needed, that is, in approximately 95% of the cases. Especially the overshoot and oscillations occurring after the rotor has been stopped are damaging.

By introducing a soft brake that controls the rpm during braking, which indirectly adapts the brake torque to match the external torque, the load on the transmission system can generally be reduced, and thereby the lifetime of the transmission system may be increased. This fact is shown by the following gearbox example.

In design lifetime calculations of gears, the braking sequence is normally not included. However, tests and experience from turbines running over a long period of time at high loads including a large number of braking sequences has shown extensive wear on the teeth in the gearboxes. Calculations have supported these results, and it is well-known that the lifetime of a gear box is determined from the brake torque and the number of braking sequences, if the brake torque is high.

When a turbine brakes, an equivalent braking torque can be calculated from the braking torque sequence. This equivalent torque is the mean 'fatigue' torque that the teeth in the gearbox will experience during the braking sequence, taking into consideration that the damage response for steel is logarithmic. An emergency braking sequence for a wind turbine will often give an equivalent torque of 2.5 times the nominal torque.

Figure 3:
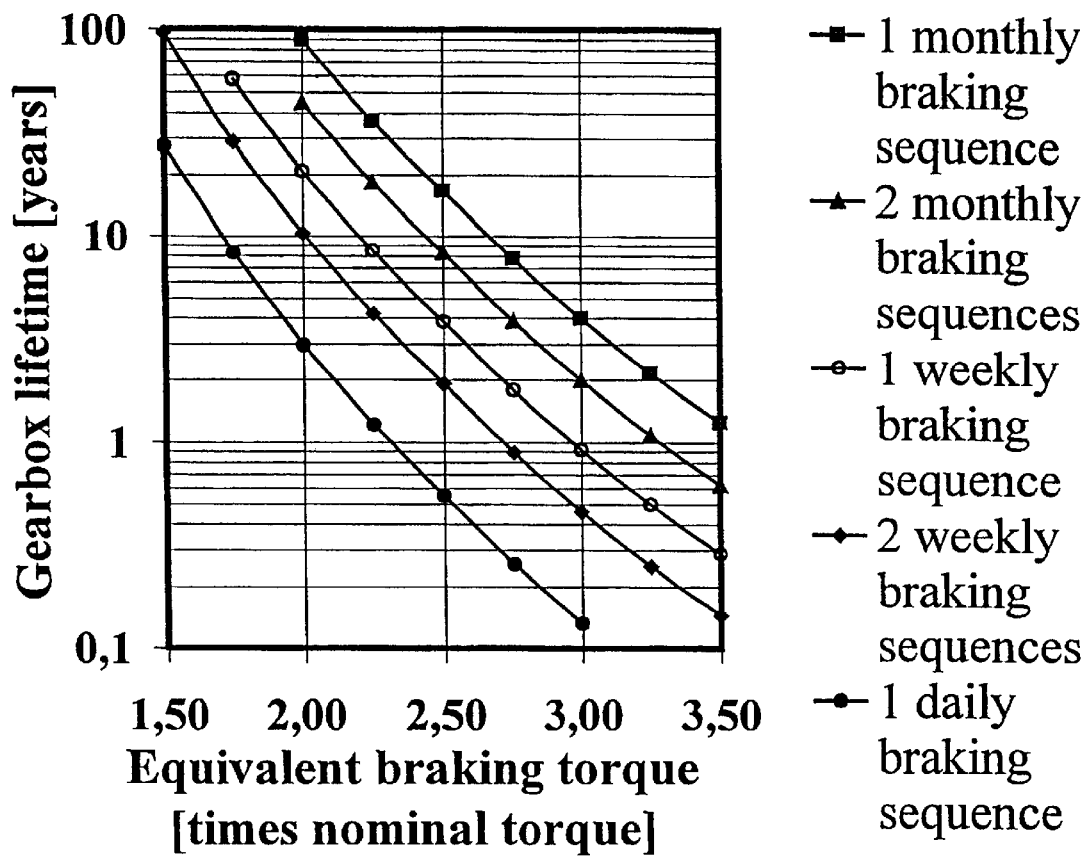

FIG. 2 shows the lifetime in years as calculated known formulae for different equivalent torques considering 2 weekly braking sequences (the nominal lifetime is used when accumulated partial damage is 1.0). In FIG. 3 this is shown for varying numbers of braking sequences (operational loads are not included in the lifetime calculations and the equivalent braking torque is typically 20–40% larger than the nominal braking torque). FIG. 2 and FIG. 3 clearly illustrate that the gear box life time is determined by the equivalent brake torque and by the number of braking sequences if the braking torque is high.

Example 2

Wind turbine testing

A possible application of a braking system according to the invention is one for use in turbines. A series of measurements was performed in preparation for a certification from the Test Station for Wind Turbines, Risø National Laboratory, Denmark. The aim of the measurements was to verify that the loads during a braking sequence were reduced by using a braking system according to the invention and to verify that the rpm followed the prescribed function during the braking sequence when using a braking sequence according to the invention.

In order to compare a braking system according to the invention, three series of measurements were performed:

1) 'Hard' braking (E1): With full braking torque, applying mechanical and air brakes at the same time.
2) 'Throttle' braking (I2): By using a throttle only to ensure that the braking torque would build up slowly. The mechanical brake was applied 15 sec. after the air brakes.
3) 'SOBO' braking (C2): By using the a braking system according to the invention. The mechanical brake was applied 15 sec. after the air brakes.

The measurements E1, I2 and C2 where made on a Danwin 180 kW/24 Kyndby wind turbine. The air brakes were turnable tips that in the braking position were turned 90° to the moving direction of the turbine blades. The gearbox was shaft mounted and torque supported with a support stay on one side. The stay was equipped with strain gauges in order to measure the torque on the main shaft.

Figure 6:
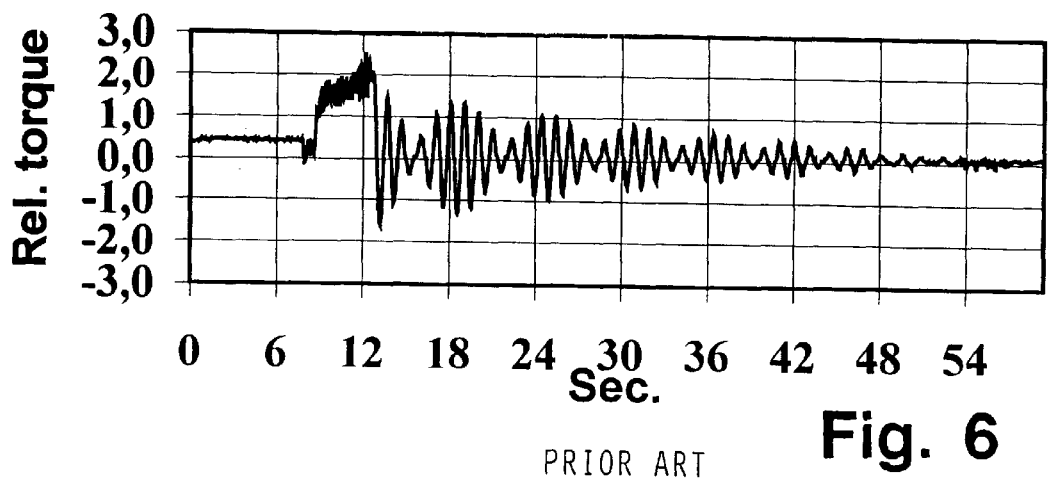
Figure 7:
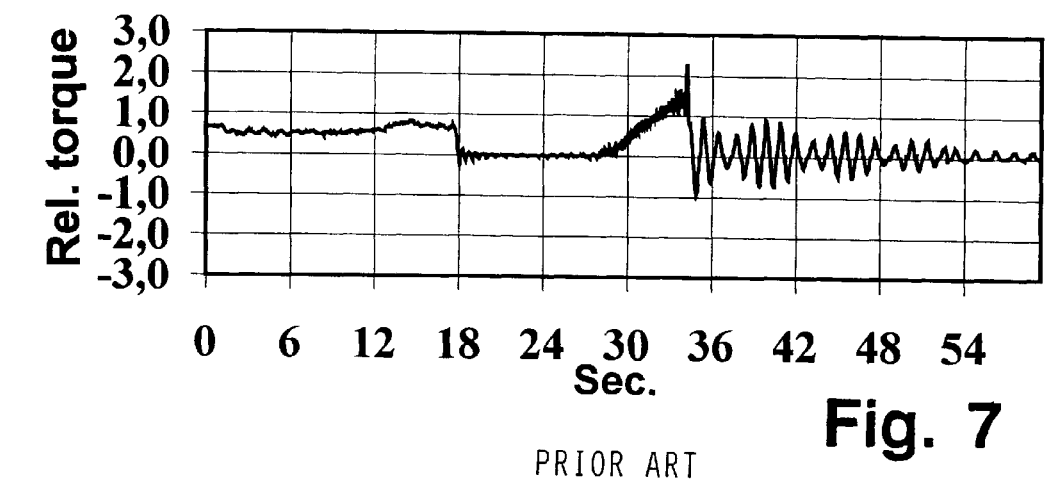
Figure 8:
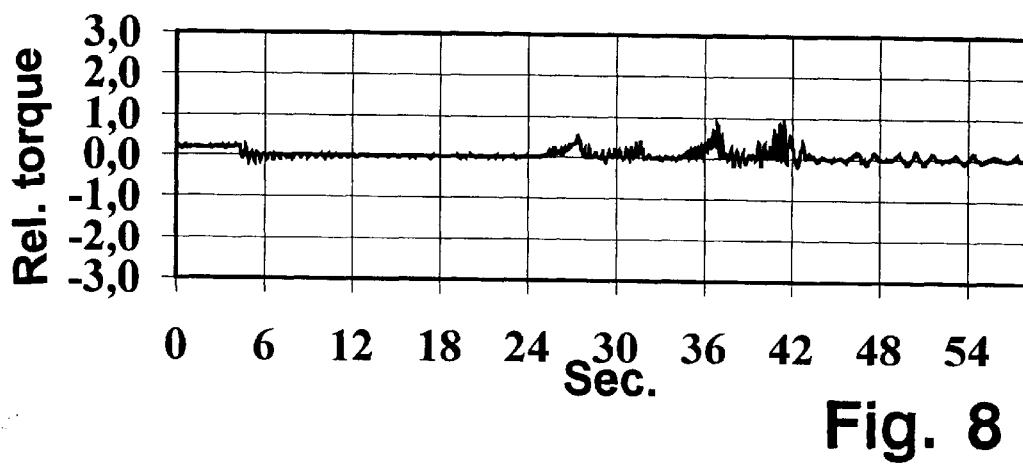
Figure 9:
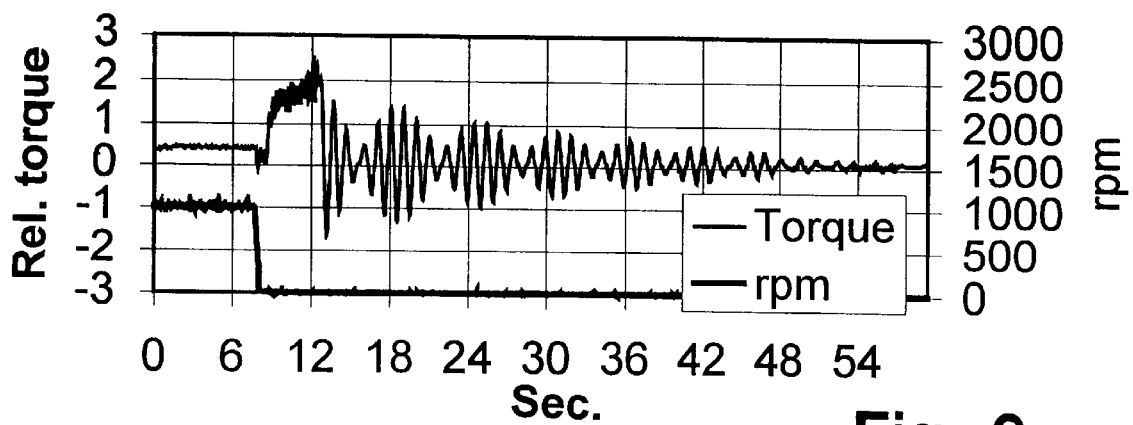
FIG. 9 is a graph showing an example of the relative torque and rpm as a function of time for a "hard" braking sequence, using a prior art braking system.
Figure 10:
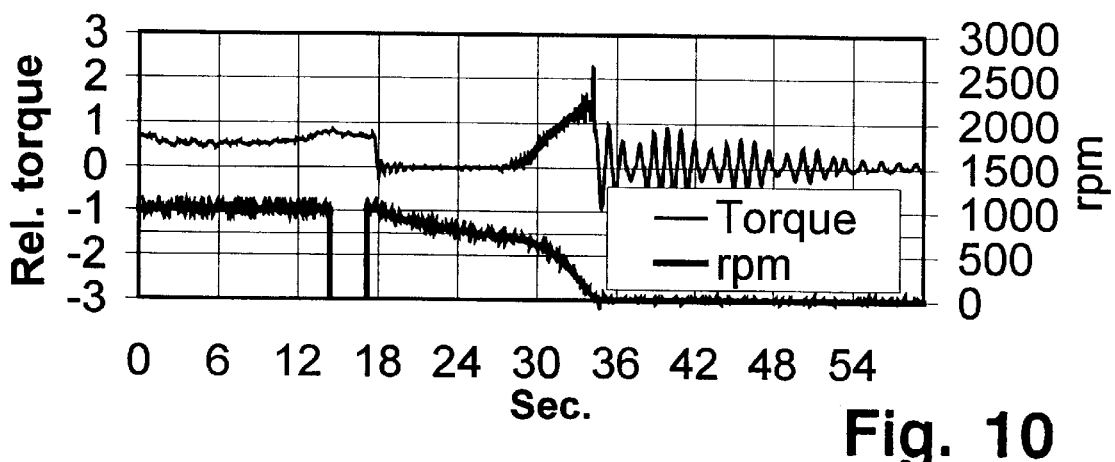
FIG. 10 is a graph showing an example of torque and rpm as a function of time for a throttled braking sequence, using a prior art braking system.
Figure 11:
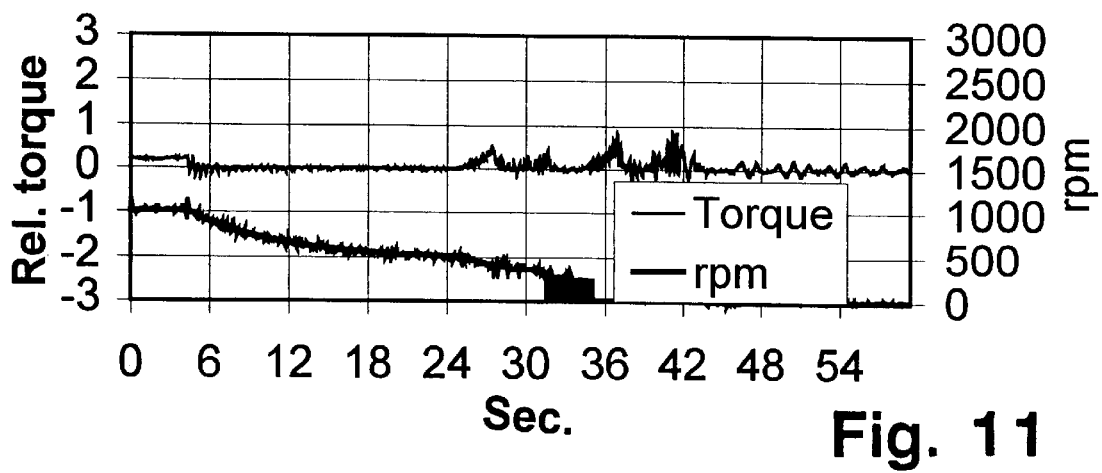
FIG. 11 is a graph showing an example of the relative torque and rpm as a function of time for a "soft" braking sequence, using a braking system according to the invention.

The table of FIG. 5 contains key data of the results of the measurements. In FIGS. 6, 7 and 8, the measurement results are shown as relative torque, related to the nominal torque at full production. In FIGS. 9, 10 and 11, the measurement results are shown as torque and rpm.

The most important parameters to the lifetime of the gearbox, is the maximum braking span after the brake has blocked, since the same teeth on the gear wheels are loaded on both sides, and the maximum braking torque.

FIG. 6 shows that a hard braking sequence results in a relative torque of approximately 0.4 during a period of approximately 7 seconds from the moment, when the braking sequence is started, followed by a period of approximately 6 seconds, where the relative torque rises to approximately 2.7. During the remaining part of the braking sequence, the relative torque performs damped oscillations, where the relative torque still reaches 0.8 after a time period of 30 seconds of the braking sequence. The hard braking sequence shows large torque oscillations with an amplitude of up to 3. This measurement clearly illustrates the damaging effect of a hard braking sequence on the transmission system (cf. example 1 above).

In FIG. 7 a braking sequence for a throttled braking sequence, using a prior art braking system, is shown. The relative torque of the throttled braking sequence varies slightly between 0.5 and 0.8 during a time period of approximately 17 seconds from the moment, when the braking sequence is started, followed by a period of approximately 12 seconds, where the relative torque is close to zero. The relative torque then rises from zero to 1 with a dynamic peak of approximately 2.3, after which the relative torque performs damped oscillations during the remaining part of the braking sequence, the amplitude of the oscillations varying from approximately 1 down to approximately 0.25, the torque still oscillates after 60 seconds. Though the throttled braking sequence reduces the magnitude of the relative torque during most of the braking sequence compared to the hard braking of FIG. 6, the amplitude of the oscillations is still very high, resulting in reduced life time of the transmission system.

The torque for a braking sequence using a braking system according to the invention is shown in FIG. 8. During a period of approximately 5 seconds from the moment, when the braking sequence is started, the relative torque is almost constant at a value of approximately 0.2, followed by a period of approximately 20 seconds, where the relative torque is close to zero with very small variations. The oscillations following this period have an amplitude of only 0.8 at the most, and after 45 seconds of braking and during the remaining part of the braking sequence, the oscillations have an amplitude of less than 0.2. As the braking sequence does not imply a relative braking torque greater than 1 at any point, the life time of the transmission system is not reduced by the braking sequence, which is not the case for any of the prior art braking systems used for the measurements of FIGS. 6 and 7. As the relative braking torque is 0.8 at the most when using a braking system according to the invention, the limit of 1 is even kept with a considerable margin.

FIG. 9 repeats the relative torque curve (upper trace) of FIG. 6 and shows the rpm (lower trace) as a function of time for a 'hard' braking sequence using a prior art braking system. The rpm drops almost instantaneously from 1000 rpm to zero, when the braking torque increases after approximately 7 seconds of braking.

In FIG. 10, the torque of FIG. 7 is repeated as absolute torque (upper trace), and the rpm (lower trace) as a function of time is shown as well. The measurements were performed on a prior art throttled braking system. Due to an error in the measurement system, the curve of rpm drops to zero between approximately 14 and 17 seconds of braking. As it can be seen, the rpm decreases approximately linearly from the 17th to 29th second of braking, and again linearly, but with a greater slope, from the 31st to the 34th second of braking. The effect of using a throttled braking system is illustrated clearly by the curve of rpm, but as for the hard braking sequence, the torque shows large oscillations after the rotor has been stopped.

In FIG. 11, the torque curve of FIG. 8 is repeated (upper trace), and the rpm (lower trace) as a function of time is shown. The curves were obtained by measurements performed when using a braking system according to the invention. Due to an error in the measurement system, the curve of the rpm shows oscillations between the 32nd and 35th second of the braking sequence. Apart from this error in the measurement system, the rpm curve follows the prescribed curve, that in this case was an approximation of a logarithmic function. The effect of using a braking system according to the invention and the effect of prescribing the rpm as a function of time is clearly seen from the torque curve. Other functions of the velocity are possible, and may easily be programmed into the memory of the control system according to the invention.

What is claimed is:

1. A hydraulic braking system comprising
   a hydraulic brake with a hydraulic fluid chamber,
   a source of hydraulic fluid for supplying hydraulic fluid at pressure greater than ambient pressure,
   a first hydraulic valve means having a first switch and a second hydraulic valve means having a second switch, each valve means having a first port, a second and a third port,
   the first port of the second valve means being connected to the second port of the first valve means,
   the first port of the first valve being connected to the source of hydraulic fluid,
   the third ports of the first and the second valve means being connected to the ambience
   the second port of the second valve means being connected to the hydraulic fluid chamber,
   the first and the second switch connects the first ports to the second ports and closes the third ports when in a first position and closes the first ports and connects the second ports to the third ports when in a second position,
   a hydraulic accumulator for the hydraulic fluid under pressure connected to the second port of the first valve means and connected to the first port of the second valve means,
   whereby the hydraulic pressure in the hydraulic fluid chamber can be controlled by selectively positioning the first and the second switches in there first and second positions so as to control the braking pressure exerted by the hydraulic brake in such a way that preservation of the hydraulic pressure in the fluid chamber during a time period after pressure loss in the hydraulic fluid supplied by the source and for smoothing of the pressure variations in the hydraulic system is obtained.

2. A hydraulic system according to claim 1, further comprising a throttling valve connected in series with the first and the second valve means for throttling the flow, so that the volume flow rate of the hydraulic fluid flowing into or out of the hydraulic chamber is substantially constant, and for controlling the response time of the pressure in the hydraulic fluid chamber to the control signals controlling the operation of the switches.

3. A hydraulic system according to claim 1, further comprising a second hydraulic accumulator connected to the hydraulic system between the first valve and the hydraulic chamber for increasing displaced hydraulic fluid volume to or from the fluid chamber, whereby sensitivity of the first and/or the second valve means to conditions and quality of the hydraulic fluid is reduced, and for smoothing pressure variations in the hydraulic system.

4. A hydraulic system according to claim 1, wherein the first valve means comprises a three-way valve.

5. A hydraulic system according to claim 1, wherein the second valve means comprises a three-way valve.

6. A hydraulic system according to claim 1, further comprising a container for containing hydraulic fluid at ambient pressure.

7. A hydraulic system according to claim 1, wherein the second valve means connects the hydraulic fluid chamber to the hydraulic fluid container irrespective of the position of the first switch when the second switch is in its second position.

8. A hydraulic system according to claim 1, wherein the source of hydraulic fluid under pressure comprises a pump being connected at a suction side to the hydraulic fluid container and at a pressure side to the first port of the first valve means.

9. A hydraulic system according to claim 8, further comprising a pressure relief valve limiting the pressure at the pressure side of the pump to a maximum threshold value defined by the relief valve.

10. A hydraulic system according to claim 8, further comprising a manometric switch for sensing a pressure in the hydraulic system at the pressure side of the pump and for switching the pump on when the pressure is lower than a prescribed minimum threshold value, and for switching the pump off, when the pressure is greater than a prescribed maximum threshold value.

11. A hydraulic system according to claim 1, wherein the hydraulic brake is a negative brake.

12. A hydraulic system according to claim 1, wherein the hydraulic brake is a positive brake.

13. A hydraulic system according to claim 1, wherein at least one of the first and second switches can be operated by electrical signals.

14. A hydraulic system according to claim 1, wherein at least one of the first and second switches can be operated by mechanical means.

15. A hydraulic system according to claim 1, wherein the position of at least the first switch can be switched by hand.

16. A hydraulic system according to claim 1, wherein the position of at least the second switch can be switched by hand.

17. A control system for the hydraulic braking system according to claim 1, adapted to decrease or increase a velocity of a moving mechanical element or system, the control system comprising
   means for storing a prescribed function of velocity of the moving mechanical element or system as a function of time,
   means for determining the velocity of the moving mechanical element or system at prescribed first time intervals,
   valve control means for controlling a switching of the first switch between its first and second positions.

18. A control system according to claim 17, wherein the valve control means comprising a processor means adapted to at each determination of the velocity:
   deriving from the storing means a corresponding prescribed velocity, and
   comparing the determined velocity with the corresponding prescribed velocity, and
   switching the first switch into that of its first and second positions that increases the braking-pressure exerted by the hydraulic brake for a prescribed second time interval, if the determined velocity is greater than the corresponding prescribed velocity, and
   switching the first switch into that of its first and second positions that decreases the braking pressure exerted by the hydraulic brake for a prescribed third time interval, if the determined velocity is smaller than the corresponding prescribed velocity.

19. A control system according to claim 17, further comprising
   means for storing the determined velocity at a number of time instants,
   processor means for determining the actual acceleration or deceleration of the moving mechanical element or system from the stored values of determined velocity,
   means for determining the actual pressure in the hydraulic fluid chamber at prescribed fourth time intervals,
   processor means for determining the desired pressure in the hydraulic fluid chamber at prescribed fifth time intervals from the determined acceleration or deceleration and from mechanical characteristics of the moving mechanical element or system and the hydraulic brake,
   processor means for at each determination of the actual pressure
      comparing the determined actual pressure with the corresponding desired pressure, and
      switching the first switch into that of its first and second positions that increases the braking pressure exerted by the hydraulic brake for a prescribed sixth time interval, if the determined actual pressure is smaller than the corresponding desired pressure, and
      switching the first switch into that of its first and second positions that decreases the braking pressure exerted by the hydraulic brake for a prescribed seventh time interval, if the determined actual pressure is greater than the corresponding desired pressure.

20. A control system according to claim 17, further comprising
   means for storing a maximum threshold value of the velocity of the moving mechanical element or system, and
   processor means for switching the second switch into its second position, when the velocity of the moving mechanical element or system exceeds the maximum threshold value.

21. A control system according to claim 17, further comprising processor means for switching the second switch into its second position in any emergency situation registered by the control system.

22. A control system according to claim 17, further comprising processor means for supervising the components of the control system and being adapted to, in case of an error being registered in the components of the control system, increase the braking pressure only by switching the second switch into its second position.

23. A control system according to claim 17, wherein the means for determining the velocity of the moving mechanical element or system is a revolution counter.

24. A method of controlling a hydraulic brake system, said brake system comprises a hydraulic brake with a hydraulic fluid chamber, a source of hydraulic fluid for supplying hydraulic fluid at pressure greater than ambient pressure, and a hydraulic valve means having a first port connected to the source of hydraulic fluid, a second port connected to the hydraulic fluid chamber, a third port connected to the ambience, a switch which in a first position connects the first port to the second port and closes the third port and which in a second position closes the first port and connects the second port to the third port, whereby the hydraulic pressure in the hydraulic fluid chamber can be controlled by selectively positioning the switch in its first and second positions so as to control the braking pressure exerted by the hydraulic brake,
   the method comprises the steps of
      storing in a memory a prescribed function of velocity of the moving mechanical elements or system as a function of time,
      determining the velocity at prescribed first time intervals, at each determination of the velocity at the prescribed first time intervals,
      comparing the determined velocity with a corresponding prescribed velocity, and
      switching the switch into that of its first and second positions that increases the braking pressure exerted by the hydraulic brake for a prescribed third time interval, if the determined velocity is greater than the corresponding prescribed velocity, and
      switching the switch into that of its first and second positions that decreases the braking pressure exerted by the hydraulic brake for a prescribed fourth time interval, if the determined velocity is smaller than the corresponding prescribed velocity.

25. A method according to claim 24, wherein each of the first, third, fourth, fifth, sixth, seventh and eighth time intervals are substantially smaller than a total braking time interval.

26. A method according to claim 24, further comprising the step of switching the switch into its second position when the velocity of the moving mechanical element or system exceeds a maximum threshold value.

27. A method according to claim 24, further comprising the step of switching the switch into its second position in any situation, where the valve means may not be used for controlling the braking pressure.

28. A method of controlling a hydraulic brake system, said brake system comprises a hydraulic brake with a hydraulic fluid chamber, a source of hydraulic fluid for supplying hydraulic fluid at pressure greater than ambient pressure, and a hydraulic valve means having a first port connected to the source of hydraulic fluid, a second port connected to the hydraulic fluid chamber, a third port connected to the ambience, a switch which in a first position connects the first port to the second port and closes the third port and which in a second position closes the first port and connects the second port to the third port, whereby the hydraulic pressure in the hydraulic fluid chamber can be controlled by selectively positioning the switch in its first and second positions so as to control the braking pressure exerted by the hydraulic brake, the method comprises the steps of storing a determined velocity of the moving mechanical elements or system at a number of time instants, determining the actual acceleration or deceleration of the moving mechanical element or system from the stored values of the determined velocity, determining the actual pressure in the hydraulic fluid chamber at prescribed fifth time intervals, determining the desired pressure in the hydraulic fluid chamber at prescribed sixth time intervals from the determined actual acceleration or deceleration and from the mechanical characteristics of the moving mechanical element or system and of the hydraulic brake, at each determination of the actual pressure comparing the determined actual pressure with the corresponding desired pressure, and switching the switch into that of its first and second positions that increases the braking pressure exerted by the hydraulic brake for a prescribed seventh time interval, if the determined actual pressure is smaller than the corresponding desired pressure, and switching the switch into that of its first and second positions that decreases the braking pressure exerted by the hydraulic brake for a prescribed eighth time interval, if the determined actual pressure is greater than the corresponding desired pressure.

29. A method according to claim 28, wherein each of the first, third, fourth, fifth, sixth, seventh and eighth time intervals are substantially-smaller than a total braking time interval.

30. A method according to claim 28, further comprising the step of switching the switch into its second position when the velocity of the moving mechanical element or system exceeds a maximum threshold value.

31. A method according to claim 28, further comprising the step of switching the switch into its second position in any situation, where the valve means may not be used for controlling the braking pressure.

32. A method for controlling at least two braking systems according to claim 31, each of them being controlled by a method according to the steps of:

storing in a memory a prescribed function of velocity of the moving mechanical elements or system as a function of time, determining the velocity at prescribed first time intervals, at each determination of the velocity of the prescribed first time intervals, comparing the determined velocity with a corresponding prescribed velocity, switching the switch into that of its first and second positions that increases the braking pressure exerted by the hydraulic brake for a prescribed third time interval, if the determined velocity is greater than the corresponding prescribed velocity, and switching the switch into that of its first and second positions that decreases the braking pressure exerted by the hydraulic brake for a prescribed fourth time interval, if the determined velocity is smaller than the corresponding prescribed velocity;

the method further comprising the steps of:

initiating the braking sequence of each of the braking systems by the same signal, and controlling the braking sequence of each of the braking systems from the same prescribed function of velocity of the moving mechanical element or system, so as to obtain synchronized braking sequences for the at least two braking systems.

33. A method for controlling at least two braking systems according to claim 1, each of them being controlled by a method according to the steps of:

storing the determined velocity of the moving mechanical elements or system at a number of time instants, determining the actual acceleration or deceleration of the moving mechanical element or system from the stored values of the determined velocity, determining the actual pressure in the hydraulic fluid chamber at prescribed fifth time intervals, determining the desired pressure in the hydraulic fluid chamber at prescribed sixth time intervals from the determined actual acceleration or deceleration and from the mechanical characteristics of the moving mechanical element or system and of the hydraulic brake, at each determination of the actual pressure comparing the determined actual pressure with the corresponding desired pressure, and switching the switch into that of its first and second positions that increases the braking pressure exerted by the hydraulic brake for a prescribed seventh time interval, if the determined actual pressure is smaller than the corresponding desired pressure, and switching the switch into that of its first and second positions that decreases the braking pressure exerted by the hydraulic brake for a prescribed eighth time interval, if the determined actual pressure is greater than the corresponding desired pressure, the method further comprising the steps of:

initiating the braking sequence of each of the braking systems by the same signal, and controlling the braking sequence of each of the braking systems from the same prescribed function of velocity of the moving mechanical element or system, so as to obtain synchronized braking sequences for the at least two braking systems.

34. A control system for at least two braking systems according to claim 1, each of them being controlled by a control system adapted to decrease or increase velocity of a moving mechanical element or system, each of the control systems comprising:

means for storing a prescribed function of velocity of the moving mechanical element or system as a function of time, means for determining the velocity of the moving mechanical element or system at prescribed first time intervals, valve control means for controlling a switching of the first switch between its first and second positions, the control system further comprising:

means for initiating the braking sequence of each of the braking systems by the same signal, and means for controlling the braking sequence of each of the braking systems from the same prescribed function of velocity of the moving mechanical element or system, so as to obtain synchronized braking sequences for the at least two braking systems.

* * * * *